G. MERTELMEYER.
AUTOMATIC COMPENSATING DEVICE.
APPLICATION FILED OCT. 25, 1916.
1,228,803.
Patented June 5, 1917.
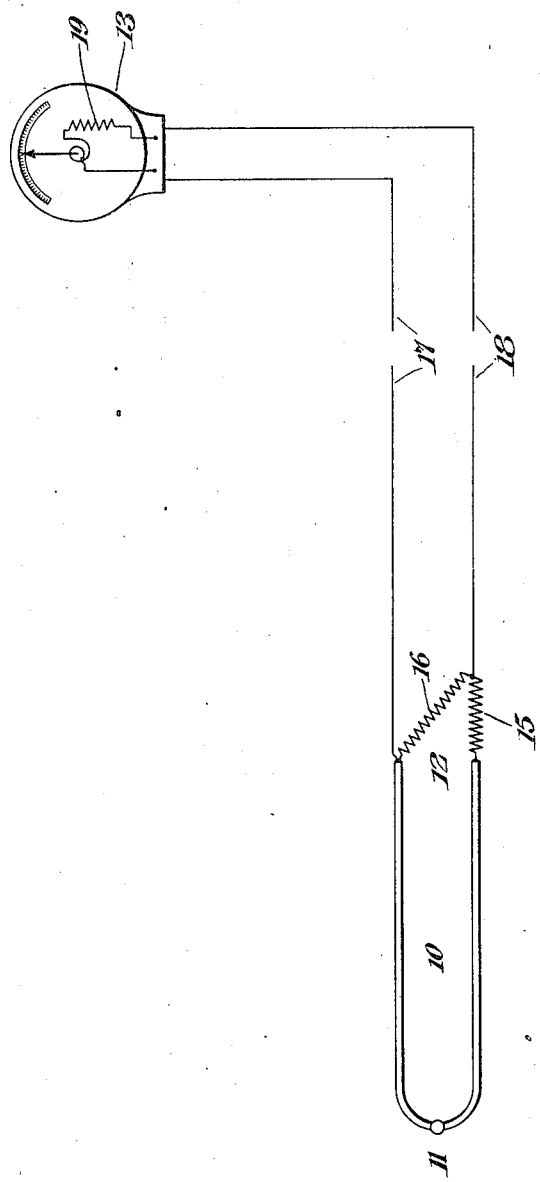
Inventor
Gisbert Mertelmeyer
By his Attorney

UNITED STATES PATENT OFFICE.

GISBERT MERTELMEYER, OF WATERBURY, CONNECTICUT, ASSIGNOR TO THE BRISTOL COMPANY, OF WATERBURY, CONNECTICUT, A CORPORATION OF CONNECTICUT.

AUTOMATIC COMPENSATING DEVICE.

1,228,803.   Specification of Letters Patent.   Patented June 5, 1917.

Application filed October 25, 1916. Serial No. 127,555.

*To all whom it may concern:*

Be it known that I, GISBERT MERTELMEYER, a former subject of the Emperor of Germany, and who has declared his intention of becoming a citizen of the United States, and a resident of Waterbury, in the county of New Haven and State of Connecticut, have invented certain new and useful Improvements in Automatic Compensating Devices, of which the following is a specification.

The invention relates to improvements in measuring instruments, more particularly to pyrometers of the thermo-electric type, comprising a thermo-electric couple composed of two dissimilar metals joined at one end to form the hot end of the couple, and of a suitable electrical measuring instrument to which the two free ends, or cold end of the couple, are adapted to be connected. It is well known that variations from a predetermined standard of temperature at the said cold end of the couple cause erroneous indications by the measuring instrument of the temperature to which the hot end of the couple is exposed.

The invention has for its object to provide means in connection with the cold end of said couple to automatically compensate over the working range of the couple for the effects of variations in temperature at said cold end from a predetermined standard temperature, as well as to simultaneously therewith partly compensate for the effects of temperature changes at the measuring instrument itself.

The accompanying drawing diagrammatically illustrates the invention.

Referring to the drawing, 10 designates the thermo-electric couple composed of two dissimilar metals, joined together at one end to form the hot end or junction 11, as is well understood. The free ends of these elements form the cold end or junction 12 of the couple, and may be connected by intermediate conductors, or directly, to the compensating member hereinafter set forth, it being essential only that the said compensating member be located in close proximity to the said cold ends in order that both shall be exposed to substantially the same temperature. 13 designates any suitable electrical instrument for measuring the difference of potential created in exposing the two ends of the thermo-electric couple to different temperatures, all of which is well understood and forms no part of the present invention.

Included between the said instrument and the said cold end of the couple, and in close proximity to the latter, is the temperature compensating device which is shown to consist of two resistances 15 and 16, the one inserted in series with one of the elements of the the couple, and the other connected in shunt across the elements of said couple. The resistance 15 is of some metal, for example manganin, having a zero temperature coefficient while the other resistance 16 is of some metal having a comparatively high temperature coefficient. Nickel has been found particularly suitable for this purpose and, as a suitable combination of resistances adapted for a thermo couple consisting, for example, of iron and constantan as elements, the resistance 15 is made of 100 ohms and the resistance 16 of 144 ohms, the instrument having a resistance of 12 ohms with and additional zero temperature coefficient resistance 19 of 164 ohms in series therewith and located within said instrument 13. It will be understood, however, that the particular resistances employed are a matter of calculation and determined by various factors, such as the thermo-electric effect of the metals composing the thermo couple, and the resistance and sensitiveness of the measuring instrument. In operation, a change of temperature at the cold end of the thermo couple will so affect the resistance 16 that the effective potential across the leads 17 and 18 connecting the cold end or junction 12 with the instrument 13 will remain substantially the same, whereby a correct indication is afforded by said instrument 13 of the actual temperature existing at the hot end or junction 11 of said couple.

I claim:

1. Automatic temperature compensating device for thermo-electric pyrometer, comprising: a plurality of resistances located in proximity to the cold end of said couple, one being connected in series therewith and another in shunt across said couple, whereby variations of temperature at the cold end of said couple will tend to divert the current flowing inversely to the said change and maintain substantially constant the effective electromotive force of said couple.

2. Automatic temperature compensating device for thermo-electric pyrometer, comprising: a plurality of resistances located in proximity to the cold end of said couple, one being connected in series therewith and of zero temperature coefficient and another connected in shunt across said couple and having an appreciable temperature coefficient, whereby variations of temperature at the cold end of said couple will tend to divert the current flowing inversely to the said change and maintain substantially constant the effective electromotive force of said couple.

3. Automatic temperature compensating device for thermo-electric pyrometer, comprising: a resistance of manganin connected in series with said couple, and a resistance of nickel connected in shunt across said couple.

4. The combination with a thermo-electric couple used as a pyrometer or thermometer, and a measuring instrument; of a compensating device located in proximity to the cold end of said couple and comprising a resistance of zero temperature coefficient in series with one of the elements of the couple, and a resistance having an appreciable temperature coefficient connected in shunt across said couple; and additional resistance of zero temperature coefficient located in series with said measuring instrument.

5. The combination with a thermo-electric couple used as a pyrometer or thermometer, and a measuring instrument; of a compensating device located in proximity to the cold end of said couple and comprising a resistance of zero temperature coefficient in series with one of the elements of the couple, and a resistance having an appreciable temperature coefficient connected in shunt across said couple; and additional resistance of zero temperature coefficient in series therewith and located within said instrument.

Signed at Waterbury, in the county of New Haven and State of Connecticut this 23rd day of October, A. D. 1916.

GISBERT MERTELMEYER.

Witnesses:
SAMUEL R. BRISTOL,
WM. H. BRISTOL.